US010906828B2

(12) United States Patent
Kopreski et al.

(10) Patent No.: US 10,906,828 B2
(45) Date of Patent: Feb. 2, 2021

(54) MODIFIED AMINES USEFUL AS SCALE INHIBITORS IN WET PROCESS PHOSPHORIC ACID PRODUCTION

(71) Applicant: CYTEC INDUSTRIES INC., Woodland Park, NJ (US)

(72) Inventors: Ryan Kopreski, Norwalk, CT (US); Lei Zhang, Stamford, CT (US); John Carr, Norwalk, CT (US); Roderick Ryles, Milford, CT (US)

(73) Assignee: Cytec Industries Inc., Princeton, NJ (US)

( * ) Notice: Subject to any disclaimer, the term of this patent is extended or adjusted under 35 U.S.C. 154(b) by 336 days.

(21) Appl. No.: 15/041,837

(22) Filed: Feb. 11, 2016

(65) Prior Publication Data

US 2016/0229725 A1 Aug. 11, 2016

Related U.S. Application Data

(60) Provisional application No. 62/114,862, filed on Feb. 11, 2015.

(51) Int. Cl.
C02F 5/12 (2006.01)
C02F 5/10 (2006.01)
C01B 25/22 (2006.01)
C01B 25/18 (2006.01)
C02F 103/10 (2006.01)

(52) U.S. Cl.
CPC .................. C02F 5/12 (2013.01); C02F 5/10 (2013.01); C01B 25/18 (2013.01); C01B 25/22 (2013.01); C02F 2103/10 (2013.01)

(58) Field of Classification Search
None
See application file for complete search history.

(56) References Cited

U.S. PATENT DOCUMENTS

| 3,062,612 A | 11/1962 | Le Boucher |
| 3,251,776 A | 5/1966 | Gee et al. |
| 3,251,778 A | 5/1966 | Dickson et al. |
| 3,258,428 A | 6/1966 | Dickson et al. |
| 3,317,431 A | 5/1967 | Kaye |
| 3,397,956 A | 8/1968 | Buchanan et al. |
| 3,437,437 A | 4/1969 | Dorwart |
| 3,553,101 A | 1/1971 | Foroulis |
| 3,653,827 A | 4/1972 | Hey et al. |
| 3,714,330 A | 1/1973 | Barker |
| 3,796,790 A | 3/1974 | Sirianni et al. |
| 3,835,215 A | 9/1974 | Marquis et al. |
| 3,931,038 A | 1/1976 | Mochi-Bartolani et al. |
| 3,972,981 A | 8/1976 | Harper et al. |
| 4,049,774 A | 9/1977 | Harper et al. |
| 4,181,787 A | 1/1980 | McOnie et al. |
| 4,221,769 A | 9/1980 | Harper et al. |
| 4,276,089 A | 6/1981 | Moran |
| 4,277,359 A | 7/1981 | Lipinski |
| 4,327,061 A | 4/1982 | Hermann et al. |
| 4,328,106 A | 5/1982 | Harrar et al. |
| 4,532,047 A | 7/1985 | Dubin |
| 4,554,090 A | 11/1985 | Jones |
| 4,562,042 A | 12/1985 | Moran |
| 4,563,284 A | 1/1986 | Amjad |
| 4,704,208 A | 11/1987 | Bouet |
| 4,952,327 A | 8/1990 | Amjad et al. |
| 4,986,970 A | 1/1991 | Haraldsen |
| 5,022,926 A | 6/1991 | Kreh et al. |
| 5,080,801 A | 1/1992 | Molter et al. |
| 5,120,519 A | 6/1992 | Gross |
| 5,256,303 A | 10/1993 | Zeiher et al. |
| 5,456,767 A | 10/1995 | Shah et al. |
| 5,575,920 A | 11/1996 | Freese et al. |
| 5,629,385 A | 5/1997 | Kuo |
| 5,764,717 A | 6/1998 | Rootham |
| 5,993,668 A | 11/1999 | Duan |
| 6,153,106 A | 11/2000 | Kelley et al. |
| 8,900,539 B2 | 12/2014 | Ravishankar et al. |
| 9,028,787 B2 | 5/2015 | Ravishankar |
| 9,242,863 B2 | 1/2016 | Ravishankar et al. |
| 2008/0111103 A1 | 5/2008 | Heitner |
| 2009/0099328 A1 | 4/2009 | Heitner et al. |
| 2010/0116750 A1 | 5/2010 | Heitner |
| 2011/0076218 A1 | 3/2011 | Ravishankar et al. |
| 2011/0076219 A1 | 3/2011 | Ravishankar et al. |
| 2012/0171099 A1 | 7/2012 | Davis et al. |

(Continued)

FOREIGN PATENT DOCUMENTS

| CN | 1724965 A | 1/2006 |
| CN | 1762857 A | 4/2006 |

(Continued)

OTHER PUBLICATIONS

International Search Report of PCT/US2016/017565, dated May 12, 2016.
Written Opinion of PCT/US2016/017565, dated May 12, 2016.
International Search Report and Written Opinion of PCT/US2015/015412, dated May 13, 2015.
International Preliminary Report on Patentability of PCT/US2015/015412, dated Aug. 16, 2016.
International Search Report and Written Opinion for PCT/US2010/049983, dated Feb. 4, 2011.

(Continued)

Primary Examiner — Clare M Perrin
(74) Attorney, Agent, or Firm — Charles E. Bell, Esq.

(57) ABSTRACT

Processes for inhibiting scale produced during wet process phosphoric acid production by adding a scale inhibiting amount of a reagent having at least one amine portion including at least one primary amine, and at least one hydrocarbyl portion having an insolubilizing group attached thereto to at least one stage of a wet process phosphoric acid production process are provided herein.

14 Claims, No Drawings

(56) References Cited

U.S. PATENT DOCUMENTS

| | | |
|---|---|---|
| 2012/0244058 A1 | 9/2012 | Ravishankar et al. |
| 2018/0179062 A1 | 6/2018 | Zhang et al. |

FOREIGN PATENT DOCUMENTS

| | | | |
|---|---|---|---|
| CN | 102397755 A | 4/2012 | |
| CN | 102399018 A | 4/2012 | |
| CN | 102874939 A | 1/2013 | |
| EP | 0065609 A1 | 12/1982 | |
| EP | 0271035 B1 | 9/1993 | |
| EP | 0677485 A1 | 10/1995 | |
| EP | 1418253 A1 | 5/2004 | |
| GB | 1095865 A | 12/1967 | |
| GB | 1406884 | 9/1975 | |
| GB | 1433123 | 4/1976 | |
| GB | 2424876 B2 | 3/2011 | |
| JP | H03197690 A | 8/1991 | |
| JP | 2002263690 A | 9/2002 | |
| WO | 199604411 A1 | 2/1996 | |
| WO | 2004083118 A1 | 9/2004 | |
| WO | 2009148866 A1 | 12/2009 | |
| WO | 2011038108 A1 | 3/2011 | |
| WO | 2011038167 A1 | 3/2011 | |
| WO | WO-2011038108 A1 * | 3/2011 | ............. C01B 25/22 |
| WO | 2012059714 A1 | 5/2012 | |
| WO | 2012128755 A1 | 9/2012 | |
| WO | 2015123294 A1 | 8/2015 | |

OTHER PUBLICATIONS

International Search Report and Written Opinion for PCT/US2010/050086, dated Feb. 10, 2011.

International Search Report and Written Opinion for PCT/US2010/029319, dated Dec. 5, 2011.

A. William Frazier et al., "Chemical Behavior of Fluorine in Production of Wet-Process Phosphoric Acid;" Environmental Science & Technology; vol. 11; No. 10; 1977; pp. 1007-1014.

Lin-Jun Yang et al., "Effect of Scale Inhibitor—Dispersant on the Crystallization of Potassium (Sodium) Fluosilicate;" Chemical Industry and Engineering; vol. 19, No. 1; 2002 (abstract).

A.D. Pandey et al., "Prevention of Scale Deposition on Heat Exchanger Surfaces by Use of High Intensity Ultrasonic Waves during Concentration of Wet Process Phosphoric Acid;" Fertiliser News; 28 (6); 1983; pp. 45-48.

Chuhua Wang et al., "Enhanced Solubility of Sodium Fluorosilicate Scale by Magnetic Treatment;" Florida Scientist; 1998; vol. 6 (1); pp. 17-25.

El-Shall H. et al., "Decreasing Iron Content in Wet-Process Phosphoric Acid: Final Report;" Florida Institute of Phosphate Research; Publication No. 01-154-171; Feb. 2001.

Notice of Allowance of US20180179062, dated Oct. 12, 2018.

* cited by examiner

MODIFIED AMINES USEFUL AS SCALE INHIBITORS IN WET PROCESS PHOSPHORIC ACID PRODUCTION

CROSS-REFERENCE TO RELATED APPLICATIONS

This application claims benefit of priority to U.S. Provisional Application No. 62/114,862 filed Feb. 11, 2015 the entire contents of which are incorporated herein by reference. This application is also related in subject matter to U.S. application Ser. No. 14/620,083 filed Feb. 11, 2015.

BACKGROUND OF THE INVENTION

Field of the Invention

The present invention generally relates to the inhibition of scale in industrial process streams. More particularly, the present invention relates to inhibiting scale (e.g., reducing or preventing the nucleation and/or growth of mineral scale solids) produced during operation of wet process phosphoric acid (WPA) production streams by addition of chemical reagents.

Description of the Related Art

About 90% of the world's phosphoric acid is produced according to the wet process, which is conventionally prepared by acidulating phosphate rock (which contains calcium phosphate) with sulfuric acid to yield a crude wet-process phosphoric acid (WPA) and insoluble calcium sulfate (gypsum).

The manufacture of phosphoric acid is well known and is the subject of numerous text books. An overall view of the manufacture of phosphates and phosphoric acid is treated by Becker in *Phosphates and Phosphoric Acids*, Marcel Dekker, Inc. 1989; and by Slack in *Phosphoric Acid, Part 1 and Part 2*, Marcel Dekker, Inc. 1968. In the process, calcium phosphate rocks are cleaned in the wash plant and ground in the Ball mill before being fed into a series of reactors for digestion with sulfuric acid along with recycled phosphoric acid from the process. After digestion, the reaction slurry is filtered to separate phosphoric acid from gypsum.

The filtered, crude WPA is then sent to clarifiers and evaporators for further purification and concentration. The purified phosphoric acid is either sent out as Merchant Grade Acid (MGA) or continued to make 69% $P_2O_5$ Super Phosphoric Acid (SPA), where it can be converted to many end products ranging from a chemical reagent, rust inhibitor, food additive, dental and orthopaedic etchant, electrolyte, flux, dispersing agent, industrial etchant, fertilizer feedstock, and component of home cleaning products. For example, crude phosphoric acid is concentrated to 54% ($P_2O_5$) before sent for Monoammonium Phosphate (MAP), Diammonium Phosphate (DAP), or ammonium phosphate-sulfate (APS) production.

As noted in U.S. Pat. No. 5,080,801 to Molter et al. (1992), which teaches various mixed polymers for preventing scale in mineral process waters from a variety of processes, due to the highly acidic environment which is inherent to phosphoric acid production (pH 1≥), these plants experience scaling problems unique to this industry. Accordingly, solutions that may be useful for reducing or preventing scale in some industrial processes frequently do not prove suitable for use in the phosphoric acid production stream. U.S. Pat. No. 5,456,767 to Shah et al. (1995) describes a similar sentiment with regard to the use of corrosion inhibitors in refinery overheads (noting that because the refinery overhead environment is extremely acidic, the corrosion inhibitors generally used in other oil field environments are not generally suitable for use with the refinery overheads).

Crude WPA contains significant amounts of dissolved impurities including carbonaceous matter, silica, and many metallic contaminants. Due to the supersaturated nature of the acid and the impurities in the phosphate ores, the concentration steps with respect to $P_2O_5$ render several side reactions, causing scale formation and/or deposition in and/or on the equipment in contact with the WPA at different stages of the phosphoric acid production process.

For example, scale from the phosphoric acid production process forms on filter cloth and pipes, heat exchangers, evaporators, concentrators, valves, and pipes during the repetitive flashing/cooling/concentrating process of the phosphoric acid production process. Twelve to fifteen different types of scaling species can usually be found throughout the phosphoric acid production process and they pose significant challenges for the industry. Moreover, different phosphoric acid production plants experience different types of scale. Even within one plant, the type of scale can differ greatly between steps in the process or even between phosphate ore composition. Plants normally have to shut down production every few weeks to physically remove the scale using high-pressure water and/or mechanical means. Valuable operating time is lost during this descaling phase resulting in reduced process capacity and ultimately reduced profits.

While some proposed solutions have focused on physical means to remove scale formation and/or deposition on equipment surfaces in the phosphoric acid production process, most have tried to solve the problem by developing a chemical-based reagent. This is the preferred approach because it requires a limited amount of capital investment and does not alter the existing process in the phosphoric acid plants. It also does not require a large amount of reagent and is therefore considered both environmental, and to have a minimal downstream impact. However, due to the complexity of the scale forming issues (e.g., processes of nucleation, crystal growth, and deposition), it is a great challenge to develop reagents useful for inhibition of scale formation and/or deposition on surfaces in contact with digested phosphate rock.

Numerous patents have attempted to address the scaling problem in the phosphoric acid production process. Some of these patents include, for example, U.S. Pat. Nos. 3,972,981, 4,221,769, and 5,120,519; Chinese Patent Nos. 1762857, and 1724965; and GB Patent Nos. 1,406,884, and 1,433,123.

Scaling in the WPA production process has also been addressed by U.S. Published Application Nos. 2011/0076218, 2011/0076219, 2012/0244058, which work has resulted in PHOSFLOW® Scale Inhibitor (commercially available from Cytec Industries Inc., Woodland Park, N.J.), as well as addressed by U.S. Provisional Application No. 61/938,235.

The economic impact for the scale-related issues is substantial, and the industry is in need of a more efficient scale prevention technology than the existing physical means of post-scale formation removal. Furthermore, while various chemical-based reagents may have some merits and applicability in scale inhibition for wet process phosphoric acid production, they are not currently in widespread use. Accordingly, the compositions and methods presently available for inhibiting the nucleation and/or growth of mineral scale solids in the phosphoric acid production process require further improvement.

Processes that employ reagent compositions and formulations that effectively inhibit the nucleation and/or growth of mineral scale solids on equipment surfaces in contact with scale-forming ions released from digested phosphate rock, thereby enabling the phosphoric acid production plant to run longer without shutting down to physically remove scale, would be a useful advance in the art and could find rapid acceptance in the industry.

SUMMARY OF THE INVENTION

The foregoing and additional objects are attained in accordance with the principles of the invention wherein the inventors detail the surprising discovery that small molecule amines as described and characterized herein are useful for preparing reagents effective for inhibiting scale produced during the wet process phosphoric acid production process.

Accordingly, in one aspect the present invention provides processes for inhibiting scale produced during wet process phosphoric acid production by adding a scale inhibiting amount of a reagent to at least one stage of a wet process phosphoric acid production process, wherein the reagent includes a reaction product formed from reacting Reactant A and Reactant B, and having an average molecular weight <1,000 Da and at least one primary amine. Reactant A includes a polyamine or polyether amine, and Reactant B includes a hydrocarbyl radical having 1 to 22 carbon atoms including an amine reactive group, wherein one or more of the carbon atoms is optionally replaced by a hetero atom, and/or optionally substituted at one or more substitutable position with a moiety as further described herein. The reagent comprising the reaction product is thereby useful in reducing or preventing scale in the wet process phosphoric acid production process. The reaction product can be further characterized as being substantially oil-free and being less soluble in an aqueous solution of the wet process phosphoric acid production process than Reactant A alone, by virtue of Reactant A being modified by/reacted with Reactant B.

In another aspect, the invention can be characterized as a process for inhibiting scale produced during wet process phosphoric acid production by adding a scale inhibiting amount of a reagent to at least one stage of the wet process phosphoric acid production stream, wherein the reagent includes a compound having at least one amine portion having at least one primary amine, and at least one hydrocarbyl portion that is part of the backbone of the compound or a pendant group attached to the backbone and/or amine portion and which includes a sufficient number of carbon atoms, or which is multiply present in sufficient number so as to reduce the solubility of the compound in an aqueous solution of the wet process phosphoric acid production stream. The compound can be further characterized as having an average molecular weight of ≤1,000 Daltons, and the reagent is further characterized as being substantially oil-free.

The effective or threshold amount of reagent useful for achieving scale inhibition in the wet process phosphoric acid production process is generally from 0.5 g per ton to 5000 g per ton of phosphoric acid.

These and other objects, features and advantages of this invention will become apparent from the following detailed description of the various embodiments of the invention taken in conjunction with the accompanying Examples.

DETAILED DESCRIPTION OF CERTAIN EMBODIMENTS OF THE INVENTION

The formation of scale in wet process phosphoric acid production results from the release of scale-forming ions from crushed and digested phosphate rock. Scale deposition on equipment surfaces in contact with the digested phosphate rock is problematic and eventually necessitates shut down of the production process for cleaning and/or descaling the equipment. Controlling scale via a reduction of scale formation and/or deposition on surfaces in contact with scale-forming ions released from digested phosphate rock translates to greater time between shut downs, which in turn provides greater efficiency and production capacity.

As summarized above, the present invention is based at least in part on the discovery that small molecule amines (i.e., amine compounds having an average molecular weight <1,000 Daltons) having a primary amine functionality are useful as scale inhibitors in the wet process phosphoric acid production process when the small molecule amine is modified at one or more substitutable position with one or more hydrocarbyl radical to effectively reduce the amine compound's solubility in an aqueous solution as compared to its native (i.e., unsubstituted) form. The compound resulting from reacting the small molecule amine with the hydrocarbyl radical is generally ≤1,000 Daltons and maintains the functionality of at least one primary amine.

The successful application of such compounds in the delayed nucleation and/or retardation (i.e., inhibition) of various scale species formed in the phosphoric acid process stream, particularly in dihydrate ("DH") or hemihydrate ("HH") plants, was surprising given that the native small molecule amine itself performed poorly as an anti-scalant, and because it was also believed by the inventors at the time of invention that to be a successful reagent a threshold amount or ratio of primary amines was required.

As will be more fully described below, while the reagents useful as anti-scalants vary in composition, they are similar in that the compounds comprising the reagents all have an average molecular weight of ≤1,000 Daltons (Da), they contain at least one primary amine, and their solubility in an aqueous solution is lower than that of the unmodified compound so as to be useful as a scale inhibitor. Additionally, while the reagents described herein may include a single compound or mixture of compounds described herein, all the reagents are substantially oil-free.

As employed throughout the disclosure of the invention, the following terms are provided to assist the reader. Unless otherwise defined, all terms of art, notations and other scientific or industrial terms or terminology used herein are intended to have the meanings commonly understood by those of skill in the chemical arts. In some cases, terms with commonly understood meanings are defined herein for clarity and/or for ready reference, and the inclusion of such definitions herein should not necessarily be construed to represent a substantial difference over the definition of the term as generally understood in the art unless otherwise indicated. As used herein and in the appended claims, the singular forms include plural referents unless the context clearly dictates otherwise.

Throughout this specification, the terms and substituents retain their definitions. A comprehensive list of chemical abbreviations commonly utilized in the field appears in the first issue of each volume of the *Journal of Organic Chemistry*. The list, which is typically presented in a table entitled "Standard List of Abbreviations," is incorporated herein by reference.

The terms "hydrocarbon" or "hydrocarbyl" are broad terms that are used herein in their ordinary sense as understood by those skilled in the art, and include aliphatic, alicyclic, and aromatic organic compounds, fragments, or radicals having an all-carbon backbone and consisting of carbon and hydrogen atoms. Such moieties can be saturated, or be mono-, or poly-unsaturated. Examples of these moieties include alkyl, cycloalkyl, alkenyl, alkynyl, and aryl ranging from 1 to 36 carbon atoms, wherein moieties having from 1 to 22 carbon atoms are preferred. Such moieties can be substituted at one or more substitutable positions by a substituent defined herein. Specific examples of hydrocarbyl include any individual value or combination of values selected from $C_1$ through $C_{36}$.

As used herein, the term "alkyl" means a straight or branched chain hydrocarbon generally containing from 1 to 36 carbon atoms. Alkyl groups having from 1 to 22 carbon atoms are preferred, with alkyl groups having 1 to 18 carbon atoms being most preferred. "Lower alkyl" refers to alkyl groups of from 1 to 6 carbon atoms. While particular examples include any individual value or combination of values selected from $C_1$ through $C_{36}$, preferred representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, n-heptyl, n-octyl, tert-octyl, n-nonyl, n-decyl, etc. Examples of lower alkyl groups include methyl, ethyl, propyl, isopropyl, butyl, s- and t-butyl and the like.

The term "alkenyl" means a straight or branched chain hydrocarbon radical containing from 2 to 36 carbons, with 2-22 carbon atoms being preferred, and containing at least one carbon-carbon double bond formed by the removal of two hydrogens. Representative examples of alkenyl include, but are not limited to, ethenyl, propylenyl, buten-1-yl, isobutenyl, penten-1-yl, 2-methylbuten-1-yl, 3-methylbuten-1-yl, hexen-1-yl, hepten-1-yl, and octen-1-yl, and the like.

"Aryl" (carbocyclic aryl) refers to a 5- or 6-membered aromatic carbocycle ring system; a bicyclic 9- or 10-membered aromatic ring system; or a tricyclic 13- or 14-membered aromatic ring system. The aromatic 6- to 14-membered carbocyclic rings include, for example, phenyl groups, benzene, naphthalene, indane, tetralin, and fluorene.

"Halides" refer to ionic compounds containing a halogen (e.g., fluorine, chlorine, bromine or iodine).

The term "substituted" is used herein in its ordinary sense as understood by those skilled in the art and, thus, includes replacement of one or more hydrogen or other suitable atom (i.e., substitutable position) in a compound, structure, or fragment of said compound or structure, with one or more organic moiety or functionality that may be the same or different. Such moiety that replaces the hydrogen or other suitable atom is referred to herein as a "substituent". As one of skill in the art would appreciate, these terms can also refer to, in certain contexts, the replacement of one or more carbon atoms in a hydrocarbon chain by a heteroatom (e.g., N, S, or O). In either case, the substituent does not interfere with the intended purpose of the compound or structure on which the substituent is incorporated. As used herein, the term "optionally substituted" just means that the referenced compound or fragment of compound can be substituted in certain embodiments at one or more substitutable positions, or remain unsubstituted in other embodiments.

Exemplary substituent groups that can be present at one or more substitutable positions of a compound, structure, or fragment of said compound or structure include, but are not limited to, OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1\text{-}12}$ alkylamino; $C_{1\text{-}12}$ dialkylamino; anilino; mercapto; $C_{1\text{-}12}$ alkylthio; sulfoxide; sulfone; $C_{1\text{-}12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy and heteroaryloxy. When the group that is substituted contains an alkyl segment, two hydrogen atoms on the same carbon atom may be replaced by a single substituent double bonded to the carbon atom (e.g., =O).

As used herein, the term "small molecule amine" refers to any amine containing compound that is <1,000 Da. As described more fully below such compounds can include, for example, aliphatic amines/diamines, cycloaliphatic and aromatic amines/diamines, oligoamines, and ether amines/diamines. The term "modified amine" just refers to the small molecule amine being substituted at one or more substitutable positions with one or more organic moieties, which may themselves be substituted or unsubstituted.

The term "scale" as used herein in reference to the wet process phosphoric acid production process refers to numerous species of mineral solids that are primarily or completely inorganic in composition and become supersaturated during the processing of phosphate ore.

As used herein, the term "oligomer" or "oligomeric" refers to a compound (e.g., a small molecule amine) containing a moiety that repeats two or more times, but not more than would cause the compound to be greater than 1,000 Da for purposes of the present invention. Typically, the moiety repeats from 2 to 10 times. The terms "oligoamine" or "polyamine" can be used interchangeably to refer to small molecule amines that have an amine moiety that repeats two or more times, but not more than would cause the small molecule amine to be greater than 1,000 Da. Similarly, the term "polyetheramine" as used herein just refers to small molecule amines that have an ether amine moiety that repeats two or more times, such that does not cause the small molecule amine to be greater than 1,000 Da.

Terms used to describe the reagents referred to herein, such as "anti-scalant" or "scale inhibitor," refer to chemical compounds, including salts thereof, and/or mixtures thereof, that are effective for delaying or preventing (i.e., inhibiting) nucleation or supersaturation of mineral scale species, or for reducing, removing, and/or eliminating existing scale in the phosphoric acid process stream. The term "scale inhibiting amount" in the context of describing the amount of reagent added to the process stream is an acceptable term to those ordinarily skilled in the art and is understood to mean an amount that is necessary to achieve any of those outcomes (preventing, reducing, or eliminating). As those skilled in the art will appreciate, the amount of reagent to be added to the process will depend on the type and/or saturation of scale being produced, as well as the outcome desired (e.g., elimination of existing scale vs. prevention of scale).

The terms "substantially free of oil" or "substantially oil-free" as used herein are interchangeable and refer to a reagent that contains less than 50% by weight of an oil, such as, but not limited to, an organic petroleum distallate. Preferably, reagents that are substantially free of oil contain less than 25 wt. % of oil; more preferably less than 10 wt. %; and more preferably still are "essentially free of oil," or "essentially oil-free," which are interchangeable terms and as used herein are taken to mean reagents containing less than 1 wt. % of oil.

The term "aqueous solution" is used herein in its ordinary sense and refers to solutions wherein the solvent is water or primarily water. The solution can simply be distilled water, for example, or can include an acidic aqueous solution from the wet process phosphoric acid stream. The term "insolubilizing group" as used herein refers to a group, substructure, or moiety on a molecule or compound that includes a sufficient number of carbon atoms, or is multiply present in a sufficient number or quantity so as to decrease the molecule's or compound's solubility in an aqueous solution. The hydrocarbyl portion of a compound that also includes an amine portion is an example of such an insolubilizing group.

Accordingly, one aspect of the invention provides processes for inhibiting scale produced during wet process phosphoric acid production, by adding a scale inhibiting amount of a reagent to at least one stage of a wet process phosphoric acid production process, wherein said reagent includes a compound having a portion that includes a small molecule amine with at least one primary amine, and at least one hydrocarbyl portion that can be part of the backbone of the compound, or can be a pendant group attached (directly or indirectly) to the backbone, and which includes at least one insolubilizing group, thereby inhibiting (i.e., preventing, reducing, or eliminating) scale in the wet process phosphoric acid production process.

While all of the reagents described herein are substantially oil-free, in preferred embodiments the reagent contains less than 25 wt. % oil, and more preferably less than 10 wt. % oil. In other embodiments, the reagents useful as anti-scalants are essentially oil-free and contain less than 1 wt. % of oil based on the weight of the reagent.

Any amine that is less than 1,000 Daltons and contains at least one primary amine are suitable for use as the amine portion of the compound. In certain embodiments, the amine portion of the compound can be derived from a polyamine or a polyetheramine, the structure of which can include, for example, those disclosed in col. 7, lines 10-28 in U.S. Pat. No. 7,999,065, which is incorporated herein by reference. When the amine portion of the compound is derived from a polyamine, for example, in certain embodiments the amine portion can be derived from polyallylamine. In other embodiments, the polyamine can be derived from polyvinylamine.

In the same or other embodiments, the hydrocarbyl portion of the compound includes an insolubilizing group having 1 to 22 carbon atoms, wherein one or more carbon atoms is optionally replaced by a hetero atom, and/or optionally substituted at one or more substitutable positions with a substituent selected from the group consisting of OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy; and heteroaryloxy.

As indicated above, the purpose of the insolubilizing group is to decrease the solubility of the small molecule amine in an aqueous solution, such as distilled water, for example. Accordingly, those skilled in the art will appreciate that the hydrocarbyl portion of the compound can be chosen accordingly so as to ensure that either a sufficient number of carbon atoms are included in the insolubilizing group, or that the hydrocarbyl portion is multiply present in a sufficient number or ratio as compared to the amines in the amine portion of the compound that the solubility of the compound in an aqueous solution is decreased (as compared to the compound without the insolubilizing group(s)).

In some embodiments, the compound having at least one amine portion containing at least one primary amine, and at least one hydrocarbyl portion having an insolubilizing group that is part of the backbone of the compound and/or a pendant group attached to the backbone is a compound according to Formula (IV):

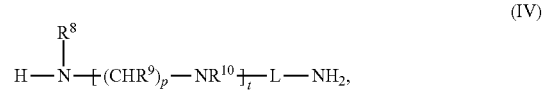

(IV)

or salts thereof
wherein
each of $R^8$ and $R^{10}$ is independently chosen from H or a hydrocarbyl radical having 1 to 22 carbon atoms, wherein one or more carbon atoms is optionally replaced by a hetero atom, and/or optionally substituted at one or more substitutable position with a substituent selected from the group consisting of OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; acylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy; and heteroaryloxy;

$R^9$ is chosen from H or a $C_1$-$C_6$ alkyl;
L is an optionally substituted hydrocarbyl fragment having 1 to 20 carbon atoms;
p is an integer chosen from 2 to 4; and
t is an integer from 0 to 10,
with the proviso that at least one of $R^8$, $R^{10}$, or L includes the hydrocarbyl portion of the compound that includes an insolubilization group.

In the same or other embodiments, the compound having at least one amine portion containing at least one primary amine, and at least one hydrocarbyl portion having an insolubilizing group that is part of the backbone of the compound and/or a pendant group attached to the backbone is a compound according to Formula (V):

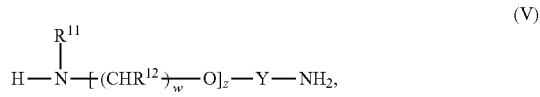

(V)

or salts thereof
wherein
$R^{11}$ is chosen from H or a hydrocarbyl radical having 1 to 22 carbon atoms, wherein one or more carbon atoms is optionally replaced by a hetero atom, and/or optionally substituted at one or more substitutable position with a substituent selected from the group consisting of OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy; and heteroaryloxy;

$R^{12}$ is chosen from H or a $C_1$-$C_4$ alkyl;

Y is L as defined for Formula (IV) (i.e., an optionally substituted hydrocarbyl fragment having 1 to 20 carbon atoms);

w is an integer from 2 to 4; and z is an integer from 1 to 10, with the proviso that at least one of $R^{11}$ or Y includes the hydrocarbyl portion of the compound that includes an insolubilization group.

In certain embodiments, each of L and Y can be independently chosen from —(CHR')$_q$—, where R is chosen from H or $C_1$-$C_6$ alkyl, and q is an integer chosen from 1 to 5.

In various embodiments, the reagent for use in the processes of the present invention can also be characterized as a reaction product between a small molecule amine (as Reactant A), and an optionally substituted hydrocarbyl radical of 1 to 22 carbon atoms having an amine reactive group, and which acts as an insolubilizing group (Reactant B). While those skilled in the art will appreciate that any small molecule amine is suitable for use as Reactant A, in certain embodiments it can be advantageous for Reactant A to be a polyamine or polyetheramine. In the same or other embodiments, one or more carbon atoms of Reactant B can be replaced by a hetero atom, and/or substituted at one or more substitutable position with a substituent selected from the group consisting of OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy; and heteroaryloxy.

In certain embodiments, Reactant A can include a small molecule amine compound according to Formula (I)

$$H_2N-(CRR^1)_m-NR^2R^3 \quad (I),$$

wherein m is an integer from 1 to 20; (more preferably an integer from 1 to 10)

each instance of R and $R^1$ is independently chosen from H, or an optionally substituted hydrocarbyl fragment having 1 to 20 carbon atoms; (more preferably a $C_1$-$C_4$ alkyl, or $C_2$-$C_6$ alkenyl); and each of $R^2$ and $R^3$ is independently chosen from H, $C_1$-$C_{12}$ alkyl, or $C_1$-$C_{12}$ alkylamine.

Representative compounds according to Formula (I) where m is from 1 to 20 are specifically contemplated as if recited herein. In certain embodiments, m is at least 2. In other embodiments m is at least 3. Similarly, each value of R—$R^3$ is specifically contemplated as if recited herein, including all permutations. In some embodiments each of R and $R^1$ are H in each instance. In other embodiments, each of R and $R^1$ can be H in some instances and $C_1$-$C_4$ alkyl in other instances. In certain embodiments, in at least one instance of R and $R^1$, one of R or $R^1$ can be $C_1$-$C_4$ alkyl, and the other is H.

In the same or other embodiment, each of $R^2$ and $R^3$ can be H. In some embodiments, one of $R^2$ or $R^3$ can be H and the other can be a $C_1$-$C_{12}$ alkyl or alkylamine. In still other embodiments, each of $R^2$ and $R^3$ can be chosen from a $C_1$-$C_{12}$ alkyl. In certain embodiments where each of $R^2$ and $R^3$ are $C_1$-$C_{12}$ alkyl, $C_1$-$C_4$ alkyl is preferred.

In other embodiments, Reactant A can include a small molecule amine compound according to Formula (II):

$$H_2N-[(CHR^4)_p-NR^5]_n-X-NH_2, \quad (II)$$

wherein each instance of $R^4$ is independently chosen from H or $C_1$-$C_6$ alkyl; (more preferably from $C_1$-$C_4$ alkyl)

each instance of $R^5$ is independently chosen from H or $C_1$-$C_4$ alkyl;

p is an integer from 2 to 4;

n is an integer from 0 to 20 (more preferably from 1 to 10);

X is an optionally substituted hydrocarbyl fragment having 1 to 20 carbon atoms (and more preferably is chosen from —(CHR')$_q$—, where R' is chosen from H or $C_1$-$C_6$ alkyl, and q is an integer chosen from 1 to 5).

In certain embodiments where Reactant A is a small molecule amine according to Formula (II), each instance of the fragment in brackets can be $$-[(CH_2)_p-NH]-$$

where p can be at least 2, and X is —(CHR')$_q$—, where q can be from 2 to 3.

In the same or other embodiments, n can be from 2 to 3. In another embodiment, $R^4$ can be $C_1$-$C_4$ alkyl in at least one instance.

In still other embodiments, Reactant A can be chosen from a small molecule amine compound according to Formula (III):

$$H_2N-[(CHR^7)_w-O]_z-T-NH_2, \quad (III)$$

wherein each instance of $R^7$ is independently chosen from H or $C_1$-$C_4$ alkyl;

T=X as defined for Formula (II) (i.e., an optionally substituted hydrocarbyl fragment having 1 to 20 carbon atoms (and more preferably is chosen from —(CHR')$_q$—, where R' is chosen from H or $C_1$-$C_6$ alkyl, and q is an integer chosen from 1 to 5);

w is an integer from 2 to 4; and z is an integer from 1 to 10.

In certain embodiments where Reactant A is a small molecule amine compound according to Formula (III), z can be at least 2, each instance of w can be from 2 to 4, and T is —(CHR')$_q$—, where q is at least 3.

Again, while any amine compound having an average molecular weight <1,000 Da and at least one primary amine is suitable for use as Reactant A, some may be more advantageous to use than others depending on the type of scale being produced in the process, or the availability and/or type of reactants as Reactant B. Particularly preferred small molecule amines suitable for use as Reactant A can include, but are not limited to, polyethyleneimine; diethylenetriamine; triethylenetetramine; tetraethylenepentamine; dipropylene triamine; diaminoalkanes (including, but not limited to, 1,2-diaminoethane; 1,3-diaminopropane; 1,4-diaminobutane; 1,5 diaminopentane; 1,5-diaminohexane; 1,8-diaminooctane); dimethylaminopropylamine; diethylaminopropylamine; bis(3-aminopropyl)-methylamine; 3-(2-aminoethyl)amino-propylamine; N,N'-bis(3-aminopropyl)-ethylenediamine; neopentanediamine; isophorone diamine; aminoaniline; aminomethylbenzylamine; 4,4'-diamino-dicyclohexylmethane; 3,3'dimethyl-4,4'-diamino-dicyclohexylmethane; 3-cyclohexylamino-propylamine; 4,7-dioxadecane-1,10-diamine; and 4,9-dioxadodecane-1,12-diamine.

In certain embodiments, Reactant A can include polyallylamine or polyvinylamine oligomers of less than 1,000 Da, or mixtures thereof. In still another embodiment, the small molecule amine can be a branched ethyleneimine oligomer, or salts thereof. Such branched ethylenimine oligomers are commercially available as EPOMIN SP-003 (MW=300 Da) or EPOMIN SP-006 (MW=600 Da) from Nippon Shokubai. In other embodiments, Reactant A can advantageously include mixtures of branched polyethyleneimine oligomers of less than 1,000 Da.

In another embodiment, the small molecule amine of Reactant A can be a linear or branched etheramine oligomer, or salts thereof. In some embodiments, the etheramine oligomer can have the general structure of $NH_2CH(CH_3)CH_2$—$(OCH_2CH(CH_3))_w$—$NH_2$, wherein w is an integer of at least 1, but not higher than would place the molecular weight of the compound above 1,000 Da. Such etheramine oligomers are commercially available from BASF Corp. or Huntsman Corp.

In the same embodiments pertaining to Reactant A, Reactant B can advantageously include a substituted hydrocarbyl fragment having 8 to 22 carbon atoms selected from the group consisting of alkyl halides; alkenyl halides; aralkyl halides; alkyl sulfates; compounds containing at least one epoxide group; and compounds containing at least one anhydride group. Again, compounds having an amine reactive portion (or "nitrogen-reactive compounds") that are suitable for use as Reactant B in the processes according to the invention are well known to those skilled in the art and have been previously disclosed at least in U.S. Pat. No. 7,999,065 at col. 7, line 51 through col. 8, line 9, which portion is specifically incorporated herein by reference as if explicitly written herein.

Particularly preferred compounds suitable for use as Reactant B for processes according to the invention can include, but are not limited to, one or more members of the group consisting of octyl chloride; dodecyl bromide; chlorohexane; benzyl chloride; dimethylsulfate; epichlorohydrin; glycidyl 4-nonylphenylether; butyl glycidyl ether; 2-ethylhexyl glycidyl ether; phenyl glycidyl ether; $C_8$-$C_{14}$ alkyl glycidyl ethers; cresyl glycidyl ether; tall oil fatty acids; $C_{12}$-$C_{18}$ tallow alkyls; octenylsuccinic anhydride; and octadecenylsuccinic anhydride.

In preferred embodiments, the reagents useful as scale inhibitors in the wet process phosphoric acid production processes according to the invention can include at least one reaction product formed between Reactant A and Reactant B, wherein Reactant A includes one or more member selected from the group consisting of triethylenetetramine; tetraethylenepentamine; dipropylene triamine; and mixtures of branched polyethyleneimine; and wherein Reactant B includes one or more member selected from the group consisting of octyl chloride; dodecyl bromide; oleyl; mixtures of octyl glycidal ethers and decyl glycidal ethers; 2-ethylhexyl glycidyl ether; mixtures of $C_{14}$, $C_{16}$, and $C_{18}$ saturated carbon chains derived from tallow; and tall oil fatty acids.

In certain embodiments, it may be preferred that the reagent include a mixture of reaction products between the small molecule amine compounds of Reactant A and the hydrocarbyl radicals of Reactant B, which contain an insolubilizing group. Indeed, those skilled in the art will recognize that any of the reagents as described herein and useful as an anti-scalant for inhibiting scale in the WPA production stream can also include mixtures of any one or more reagents, which mixtures can be added as separate reagents to the process stream at one or more stage of the phosphoric acid production process, or added as mixtures, or separately in sequence, in reverse order, or simultaneously to one or more stage of the process stream.

According to certain embodiments of the processes of the invention, the reagent as described herein can be added to any stage (including multiple stages) of a wet process phosphoric acid production stream (e.g., one or more of the milling stage, digesting stage, filtering stage, clarifying stage, or evaporator stage). While the reagent may be added at any one or more of these stages, in certain embodiments it is more preferably added to the phosphoric acid stream going to the filters or evaporators as this is where the most prevalent scaling problems occur.

In still other embodiments, the reagent can be added to any of the piping connecting the various stages of the phosphoric acid production process plant. This is sometimes referred to in the field as the "interstitial piping" or "process flow pipeline".

The reagents described herein are effective against various species of scale-forming ions most commonly found in the wet process phosphoric acid production stream. Accordingly, in certain embodiments, the reagent is useful in treating or inhibiting scale that includes, but are not limited to, at least one species of scale-forming ion chosen from $Na_2SiF_6$; $K_2SiF_6$; $CaSO_4$+2 $H_2O$; $CaSO_4$+½ $H_2O$; $CaSO_4$; $MgSiF_6$+6 $H_2O$; $Ca_3(PO_4)_2$; $CaHPO_4$; $Si_2F_6$; $CaSiF_6$+2 $H_2O$; $CaF_2$; $MgF_2$; $Mg_{0.8}Al_{1.5}F_6$+X $H_2O$, wherein X is an integer ranging from 2 to 10; $MgH_2P_6O_7$; $Al(PO_3)_3$; $NaK_2AlF_6$; $Ca_3(AlF_6)_2$+4 $H_2O$; $MgNaAlF_6$+2 $H_2O$; or $Ca_4SO_4AlSiF_{13}$+10 $H_2O$. As will be appreciated by those skilled in the art, the typical phosphoric acid process stream contains numerous species of scale-forming ions, which gives rise to the difficulty in inhibiting scale formation and/or deposition in the first place.

As will further be appreciated by those skilled in the art, the amount or dosage of reagent required to effectively inhibit scale (i.e., a scale inhibiting amount) will vary depending upon the particular reagent used and/or the severity of the scaling problem encountered, the species of scale-forming ions present, as well as the concentration or saturation of scale-forming ions.

As a general rule, the dosage is based on active reagent to the weight of phosphoric acid solution, and can range from between 0.5 g/ton to 5000 g/ton of phosphoric acid. In certain embodiments, the dosage of active reagent can be from 0.5 g/ton to 1000 g/ton of phosphoric acid solution, and preferably from 0.5 g/ton to 500 g/ton of phosphoric acid solution. In other embodiments, the dosage of active reagent is at least 100 g/ton of phosphoric acid solution, or at least 500 g/ton of phosphoric acid solution. Those skilled in the art will recognize that the contemplated dosage range includes the lower dose value and higher dose value, as well as any specific dose value there between (e.g., 0.5 g/ton, 0.6 g/ton, 0.7 g/ton, et seq. up to and including 5000 g/ton of phosphoric acid).

The scale inhibiting reagents described herein can be in liquid form (such as with water, oil and/or alcohol diluents) and may be formulated in various ways, e.g., the solid reagent may be suspended (e.g., colloidal suspension), dispersed and/or slurried in the liquid, and/or the reagent may be suspended, dispersed, slurried and/or dissolved in the liquid.

The scale inhibiting reagents described herein can be intermixed with the phosphoric acid liquor in various ways, e.g., in a single stage, in multiple stages, or if various mixtures of reagent are added, then sequentially, in reverse order, or simultaneously. For example, in one embodiment, the scale inhibiting reagent is added to diluent to form a pre-mix, and then intermixed with the phosphoric acid liquor. In another embodiment, the reagent can be added directly to the process stream. Various modes of addition will be found to be effective and can be adjusted using no more than routine experimentation.

In certain embodiments of the processes described herein, one or more other industrial additives can also be added. Such additives include, for example, other anti-scalants, biocides, corrosion inhibitors, or dispersants. The prior art is replete with such industrial treatment additives and these are generally known to those skilled in the art. Furthermore, such additives can also be added in a single stage or multiple stages of the phosphoric acid production process along with the reagents described herein. It will be appreciated that the additives can be added in the same stage or different stage as the reagent, or sequentially, in reverse order, or simultaneously.

This new type of anti-scalant effective for use in the wet process phosphoric acid production stream is unexpected because the small molecule amines by themselves (i.e., not containing an insolubilizing group) were previously known to be poor performers of scale inhibition as determined by the inventors' in-house testing method (Turbidity Test). A potential advantage of this new class of reagent could be a lower effective treatment cost, as compared to presently available commercial products.

While certain embodiments of the reagent suitable for use as a scale inhibitor with processes according to the invention have been provided herewith, those skilled in the art will appreciate that others not specifically discussed will also be encompassed by these teachings and are, thus, within the spirit and scope of the invention.

EXAMPLES

The following examples are provided to assist one skilled in the art to further understand certain embodiments of the present invention. These examples are intended for illustration purposes and are not to be construed as limiting the scope of the appended claims.

Example 1

General Synthesis of Alkylamine Reagents

Excepting those reagents that are commercially available, such as TRIAMEEN® T and DUOMEEN® O (available from Akzo Nobel Chemicals B.V.), the general synthetic procedure for the various reagents suitable for use with the present invention includes filling an appropriate vessel with some quantity of solvent allowing for a reaction to proceed between the small molecule amine, such as ethylenediamine or other aliphatic oligoamines (e.g., $H_2N(-CH_2-CH_2-NH-)_x CH_2CH_2NH_2$, or $H_2N(-CH_2-CH_2-CH_2-NH-)_y CH_2CH_2NH_2$, where x and y is an integer from 1-10), or $NH_2(-CH_2-CH_2-O-)_n CH_2CH_2NH_2$, where n=8-25), or etheramines or ethyleneimine oligomers, and any one or more organic moiety containing as its major constituent a hydrocarbon chain that may be saturated, monounsaturated, polyunsaturated or branched, along with a minor constituent which may contain any atoms to achieve a reactive product, which minor constituent will be readily known to those skilled in the art.

The combined mixture is stirred and warmed as needed to a temperature from 50-160° C., preferably from 75-85° C. for reactions between amines and glycidyl ethers or amines and alkylhalides, or from 130-140° C. with azeotropic removal of water, molecular sieve removal of water, or other appropriate method for removal of water for reactions between amines and tall oil fatty acids. The reaction time period may range from 0-72 hours but more typically is from 0-8 hours, and more typically still from 1-3 hours. The solvent may be used as the final diluent, evaporated with heat or under reduced pressure, or both, to concentrate or to further isolate the active reagent.

Example 2

Reaction Product of Tetraethylenepentamine and Octyl-, Decyl-Glycidyl Ether

To a 100 mL round-bottomed flask charged with 13 mL acetonitrile, tetraethylenepentamine ("TEPA") (MW 189.3; 1 g, 5.2 mmol) is added and dissolved with continuous stirring, followed by addition of half an equivalent of octyl-,decyl-glycidyl ether (MW~172; 0.86 g, 5 mmol) (available as ERISYS™ GE-7 from Emerald Performance Materials) by dropper. The combined mixture is stirred and heated to reflux (80° C.) for 2 hrs. The solvent is evaporated under reduced pressure and the crude is dried under vacuum (300 mTorr) to give a clear oil (Reaction Product B of Table 1).

Example 3

Reaction Product of a Mixture of Oligoamines from Distillation Bottoms of Ethyleneimine and Tall Oil Fatty Acid To a 100 mL round-bottomed flask equipped with a Dean-Stark trap, reflux condenser and a heat source and further charged with 75 mL xylenes purged with nitrogen, is added activated 4 angstrom molecular sieves followed by a mixture of oligoamines from distillation bottoms of ethyleneamine (MW~266; 3 g, 11 mmol) (available as E-100 from Huntsman), and tall oil fatty acid (MW~285; 1.6 g, 5.6 mmol) (available as XTOL® 100 from Georgia-Pacific Chemical), over 2 minutes. The combined mixture is stirred and heated to reflux (138.5° C.) for 2.5 hours. The solvent is evaporated under reduced pressure and the crude is dried under vacuum (200 mTorr) to give a yellow oil (Reaction Product I of Table 1).

Other reaction products are prepared similarly as described by Examples 1, 2, or 3, wherein the reactants and ratios are provided by reaction products A and C—H of Table 1.

Example 4

Evaluation of the Relative Performance of Reagents for Inhibiting Scale

The performance of substituted oligoamines or fatty acid amines, which have reduced solubility in an aqueous environment as compared to their unsubstituted forms, and which are thus useful as reagents for inhibiting scale in wet process phosphoric acid production is measured via a turbidity test (based on supersaturation-precipitation process). This method is useful to evaluate whether the reagent can control the precipitation of calcium sulfate and fluorosilicate type scales from process phosphoric acid solutions that have been supersaturated via evaporation and cooling. The general procedure for the test is outlined below, which is based on the generation of 16 individual samples. Those skilled in the art will appreciate that different starting and ending volumes may be used to generate greater or fewer samples. The acid may also be concentrated to a greater or lesser degree.

In a ventilated hood, 600 g of 28 wt % process phosphoric acid ($P_2O_5$) is added to a 1L Teflon beaker. The total weight of the acid and beaker is recorded. The acid is reduced in weight to approx. 400 g (i.e., concentrated to approx. 42 wt % $P_2O_5$) by heating on a hot plate (Thermo Scientific Cimarec) set at 120° C. with moderate stirring (set at 6). Concentration of the phosphoric acid to this level typically occurs after 20-24 hours and can be performed overnight.

For 100 ppm dosage of reagent, 0.2 g of 1 wt % (based on active dry component) solutions of the reagents of interest are added to 4 oz. glass vials using an analytical balance. 0.2 g of water is added to the control vials. 19.8 g of hot concentrated phosphoric acid is added to each vial using a plastic syringe with a 0.2 micron syringe filter. The vials are shaken to form a homogenous mixture and left to sit at room temperature, without agitation, for 30 min. to 24 hours.

Turbidity is measured with a HACH® 2100Q portable turbidimeter (nephelometer), or other equivalent, which is calibrated and used according to directions in the instruction manual. Each glass vial is shaken gently to loosen attached scales from sidewall and bottom of vials. The contents of the vial are emptied into the turbidity meter test cell, and the measurement is taken after 10-30 seconds. The test cell is flipped back and forth 5 times and the measurement is taken again after 10-30 seconds. The testing cell is emptied and rinsed with deionized water and dried with an air or nitrogen stream and the remaining samples are measured in the same way. Units of measurement are given as Nephelometric Turbidity Units (NTUs), with lower NTUs representing less particles suspended in the sample solution. HACH® 2100Q portable turbidimeter has an upper limit reading of 1000 NTUs. For purposes of the invention a lower NTU is desirable and indicates less scale particles and is predictive of the reagent being more effective as a scale inhibitor for wet process phosphoric acid productions streams.

Example 5

Evaluation of the Reaction Product of Triethylenetetramine and Octyl-, Decyl-Glycidyl Ether A reaction product (A) is prepared as described in Example 2, except that triethylenetetramine is substituted for the tetraethylenepentamine and an equivalent amount of octyl-, decyl-glycidyl ether is used. The performance of the reaction product as a reagent for phosphoric acid anti-scalant is measured in the turbidity test as described in Example 4, wherein 100 ppm dose of reagent is applied to a phosphoric acid liquor of 42% phosphoric acid. The results are summarized in Table 1 below.

Example 6

Evaluation of the Reaction Product of Tetraethylenepentamine and Octyl-, Decyl-Glycidyl Ether A reaction product (B) is prepared as described in Example 2. Reaction products (C) and (D) are also prepared according to Example 2, except that the reactants are present at a 1:1 and a 1:2 ratio, respectively. The performance of the reaction products as suitable reagents for phosphoric acid anti-scalant are measured in the turbidity test as described in Example 4, wherein 100 ppm dose of reagent is applied to a phosphoric acid liquor of 40% phosphoric acid. The results are summarized in Table 1 below.

Example 7

Evaluation of the Reaction Product of Tetraethylenepentamine and an Alkylhalide

Reaction products (E) and (F) are prepared as described in Example 2, except the hydrocarbon chain is octylchloride and dodecylbromide, respectively. The performance of the reaction products as suitable reagents for phosphoric acid anti-scalant are measured in the turbidity test as described in Example 4, wherein 100 ppm and 500 ppm dose of reagent, respectively is applied to a phosphoric acid liquor of 42% phosphoric acid. The results are summarized in Table 1 below.

Example 8

Evaluation of the Reaction Product of Tetraethylenepentamine and 2-Ethylhexyl Glycidyl Ether A reaction product (G) is prepared as described in Example 2, except that half an equivalent of 2-ethylhexyl glycidyl ether is used in place of octyl-, decyl-glycidyl ether. The performance of the reaction product as a suitable reagent for phosphoric acid anti-scalant is measured in the turbidity test as described in Example 4, wherein 500 ppm dose of reagent is applied to a phosphoric acid liquor of 42% phosphoric acid. The results are summarized in Table 1 below.

Example 9

Evaluation of the Reaction Product of Mixture of Oligoamines from Distillation Bottoms of Ethyleneamines and Octyl-, Decyl-Glycidyl Ether A reaction product (H) is prepared as described in Example 2, except that equivalent amounts of reactants are used and E-100 from Huntsman (mixture of oligoamines from distillation bottoms of ethyleneamine) is substituted for the tetraethylenepentamine. The performance of the reaction product as a suitable reagent for phosphoric acid anti-scalant is measured in the turbidity test as described in Example 4, wherein 100 ppm dose of reagent is applied to a phosphoric acid liquor of 42% phosphoric acid. The results are summarized in Table 1 below.

Example 10

Evaluation of the Reaction Product of a Mixture of Oligoamines from Distillation Bottoms of Ethyleneamines and Tall Oil Fatty Acid A reaction product (I) is prepared as described in Example 3. The performance of the reaction product as a suitable reagent for phosphoric acid anti-scalant are measured in the turbidity test as described in Example 4, wherein 100 ppm dose of reagent is applied to a phosphoric acid liquor of 42% phosphoric acid. The results are summarized in Table 1 below.

Example 11

Evaluation of N-Tallowalkyl Dipropylene Triamines (Commercially Available as TRIAMEEN® T from AkzoNobel)

TRIAMEEN® T is a mixture of compounds of dipropylene triamine substituted with a mixture of hydrocarbon chains derived from tallow. The performance of the reaction product as a suitable reagent for phosphoric acid anti-scalant are measured in the turbidity test as described in Example 4, wherein 100 ppm dose of reagent is applied to a phosphoric acid liquor of 45% phosphoric acid. The results are summarized in Table 1 below.

Example 12

Evaluation of N-Oleyl-1,3-Diaminopropane (Commercially Available as DUOMEEN® O from AkzoNobel)

DUOMEEN® O is an oleylpropylene diamine (diaminopropane substituted with an oleyl hydrocarbon chain). The performance of the reaction product as a suitable reagent for phosphoric acid anti-scalant are measured in the turbidity test as described in Example 4, wherein 1000 ppm dose of reagent is applied to a phosphoric acid liquor of 44% phosphoric acid. The results are summarized in Table 1 below.

Example 13

Evaluation of the Reaction Product of Ethyleneimine Oligomers of MW 300 and 600 with Octyl-, Decyl-Glycidyl Ether Reaction products (J-P) are prepared as described in Example 2, except that ethyleneimine oligomers are replaced with tetraethylenepentamine. Ethyleneimine oligomers of the indicated molecular weights are commercially available as EPOMIN SP-003 and EPOMIN SP-006 from Nippon Shokubai. The moles of reactants are varied. The performance of the reaction product as a suitable reagent for phosphoric acid anti-scalant is measured in the turbidity test as described in Example 4, wherein various doses (from 10 ppm to 100 ppm) of each reagent is applied to a phosphoric acid liquor of 42% phosphoric acid. The results are summarized in Table 1 below, where the NTU of the reaction product is provided as a negative number to indicate how much lower the NTU of the reaction product was than the NTU of the control.

TABLE 1

Summary of Evaluation of Examples 6-12, wherein Reactant A is the small molecule amine and Reactant B is the compound from which the organic moiety or moieties (T) is derived. Time is given in minutes and dose in part per million (ppm)

| Reaction Product | Reactant A | Reactant B | Moles A | Moles B | NTU Blank | NTU Prod. | NTU time | Dose (ppm) |
|---|---|---|---|---|---|---|---|---|
| A | TETA | GE-7 | 1 | 1 | 758 | 123 | 300' | 100 |
| B | TEPA | GE-7 | 2 | 1 | 1000 | 54 | 120' | 100 |
| C | TEPA | GE-7 | 1 | 1 | 1000 | 142 | 120' | 100 |
| D | TEPA | GE-7 | 1 | 2 | 1000 | 334 | 120' | 100 |
| E | TEPA | Octyl-Cl | 2 | 1 | 173 | 162 | 40' | 100 |
| F | TEPA | Dodecyl-Br | 2 | 1 | 852 | 93 | 70' | 500 |
| G | TEPA | 2-EHGE | 2 | 1 | 852 | 80 | 70' | 500 |
| H | E-100 | GE-7 | 1 | 1 | 1000 | 161 | 45' | 100 |
| I | E-100 | TOFA (XTOL) | 2 | 1 | 900 | 22 | 60' | 100 |
| TRIAMEEN-T | DPTA | TA | N/A | N/A | 921 | 477 | 330' | 100 |
| DUOMEEN-O | PDA | oleyl | N/A | N/A | 667 | 137 | 300' | 1000 |
| J | EPOMIN SP-003 (MW 300) | GE-7 | 1 | 1 | — | −221 | 150 | 10 |
| K | EPOMIN SP-003 (MW 300) | " | 1 | 2 | — | −217 | 150 | 10 |
| L | EPOMIN SP-003 (MW 300) | " | 1 | 1 | — | −457 | 150 | 50 |
| M | EPOMIN SP-003 (MW 300) | " | 1 | 1 | — | −238 | 1200 | 100 |
| N | EPOMIN SP-006 (MW 600) | GE-7 | 1 | 1 | — | −157 | 150 | 10 |

TABLE 1-continued

Summary of Evaluation of Examples 6-12, wherein Reactant A is
the small molecule amine and Reactant B is the compound from which the organic moiety
or moieties (T) is derived. Time is given in minutes and dose in part per million (ppm)

| Reaction Product | Reactant A | Reactant B | Moles A | Moles B | NTU Blank | NTU Prod. | NTU time | Dose (ppm) |
|---|---|---|---|---|---|---|---|---|
| O | EPOMIN SP-006 (MW 600) | " | 1 | 1 | — | −471 | 150 | 50 |
| P | EPOMIN SP-006 (MW 600) | " | 1 | 1 | — | −239 | 1200 | 100 |

"TETA" = triethylenetetramine.
"TEPA" = tetraethylenepentamine.
"E-100" = a mixture of oligoamines from distillation bottoms of ethyleneimine as sold by Huntsman.
"GE-7" = a mixture of octyl-, decyl-glycidyl ethers as sold by Emerald Performance Materials and marketed as ERISYS® GE-7.
"2-EHGE" = 2-ethylhexyl glycidyl ether commercially available from Sigma Aldrich.
"DPTA" = dipropylene triamine.
"TA" = tallow-alkyl, a mixture of C14, C16 and C18 chains, saturated and containing one or more unsaturations as derived from tallow.
"PDA" = 1,3-propanediamine.
"oleyl" = a monounsaturated oleyl carbon chain.
"TOFA" = tall oil fatty acid and is either XTOL® 100 sold by Georgia-Pacific Chemicals or SYLFAT™ FA2 sold by Arizona Chemical.
DUOMEEN® O is a diaminopropane substituted with an oleyl hydrocarbon chain (oleylpropylene diamine) and is commercially available from AkzoNobel.
TRIAMEEN® T is a mixture of dipropylene triamines substituted with various lengths of hydrocarbon chains derived from tallow and is commercially available from AkzoNobel.
EPOMIN SP-003 and SP-006 are ethyleneimine oligomers of MW 300 and 600, respectively, and are commercially available from Nippon Shokubai In view of the above description and the examples, one of ordinary skill in the art will be able to practice the disclosure as claimed without undue experimentation.

While typical embodiments have been set forth for the purpose of illustrating the fundamental novel features of the present invention, the foregoing descriptions should not be deemed to be a limitation on the scope herein. Accordingly, various modifications, adaptations, and alternatives can occur to one skilled in the art without departing from the spirit and scope of the invention described herein, and the scope of the invention should be defined by the appended claims. While the claims below are presented as singly dependent for purposes of convention and cost, those skilled in the art will understand from reading the detailed description that multiply dependent embodiments are also contemplated by the inventors and that any of the claims below can be written as such.

We claim:

1. A process for inhibiting scale produced during wet process phosphoric acid production, the process comprising
adding a scale inhibiting amount of a reagent to at least one stage of a wet process phosphoric acid production process, said reagent comprising a reaction product having a weight average molecular weight ≤1 kDa and at least one primary amine, wherein said reaction product is characterized as the product between Reactant A and Reactant B,
wherein Reactant A is selected from the group consisting of diethylenetriamine; triethylenetetramine; tetraethylenepentamine; dipropylene triamine; diaminoalkanes; dimethylaminopropylamine; diethylaminopropylamine; bis(3-aminopropyl)-methylamine; 3-(2-aminoethyl)amino-propylamine; N,N'-bis(3-aminopropyl)-ethylenediamine; neopentanediamine; isophorone diamine; aminoaniline; aminomethylbenzylamine; 4,4'-diamino-dicyclohexylmethane; 3,3'dimethyl-4,4'-diamino-dicyclohexylmethane; 3-cyclohexylamino-propylamine; 4,7-dioxadecane-1,10-diamine; and 4,9-dioxadodecane-1,12-diamine; and
wherein Reactant B comprises a hydrocarbyl radical having 1 to 22 carbon atoms that includes an amine reactive group, wherein one or more carbon atoms is optionally replaced by a hetero atom, and/or optionally substituted at one or more substitutable position with a substituent selected from the group consisting of OH; $C_1$-$C_{12}$ alkyl; $C_1$-$C_{12}$ alkenyl; allyl; halogen; $C_1$-$C_{12}$ haloalkyl; $C_1$-$C_{12}$ alkoxy; hydroxy $C_1$-$C_{12}$ alkyl; carboxy; $C_1$-$C_{12}$ alkoxycarbonyl; $C_1$-$C_{12}$ carboxyalkoxy; $C_1$-$C_{12}$ carboxamido; cyano; formyl; $C_1$-$C_{12}$ acyl; $C_2$-$C_{12}$ alkyl ester or alkylhydroxy ester; $C_6$-$C_{12}$ aryl ester; nitro; amino; $C_{1-12}$ alkylamino; $C_{1-12}$ dialkylamino; anilino; mercapto; $C_{1-12}$ alkylthio; sulfoxide; sulfone; $C_{1-12}$ acylamino; amidino; aryloxy; arylamino; amido; epoxy; carbonyl; alkoxycarbonyl (ester); nitrile; ureido; silanol; phenyl; benzyl; heteroaryl; heterocycle; phenoxy; benzoyl; benzoyl substituted with amino, hydroxy, methoxy, methyl or halo; benzyloxy; and heteroaryloxy, provided that Reactant B includes at least 4 carbon atoms, which can be cyclic, linear, or branched,
wherein the reaction product of Reactant A and Reactant B is less soluble in an aqueous solution of the wet process phosphoric acid production stream than Reactant A alone; and
wherein said reagent is substantially free of oil.

2. A process according to claim 1, wherein the hydrocarbyl radical of Reactant B includes 8 to 22 carbon atoms and is selected from one or more members of the group consisting of alkyl; alkyl halides; alkenyl halides; aralkyl halides; alkyl sulfates; compounds containing at least one epoxide group; and compounds containing at least one anhydride group.

3. A process according to claim 1, wherein the hydrocarbyl radical of Reactant B is selected from one or more members of the group consisting of oleyl halides; octyl chloride; dodecyl bromide; chlorohexane; benzyl chloride; dimethylsulfate; epichlorohydrin; glycidyl 4-nonylphenylether; butyl glycidyl ether; 2-ethylhexyl glycidyl ether; phenyl glycidyl ether; $C_8$-$C_{14}$ alkyl glycidyl ethers; cresyl glycidyl ether; tall oil fatty acids; $C_{12}$-$C_{18}$ tallow alkyls; octenylsuccinic anhydride; and octadecenylsuccinic anhydride.

4. A process according to claim 1, wherein the reagent includes at least one reaction product formed from a reaction between Reactant A and Reactant B, wherein Reactant A includes one or more member selected from the group consisting of triethylenetetramine; tetraethylenepentamine; and dipropylene triamine; and wherein the hydrocarbyl radical of Reactant B includes one or more member selected from the group consisting of octyl chloride; dodecyl bromide; oleyl; mixtures of octyl glycidal ethers and decyl glycidal ethers; 2-ethylhexyl glycidyl ether; mixtures of $C_{14}$, $C_{16}$, and $C_{18}$ saturated carbon chains derived from tallow; and tall oil fatty acids.

5. A process according to claim 1, wherein the reagent is a mixture of reaction products.

6. A process according to claim 5, wherein the reagent is a mixture that includes (Z)—N-9-octadecenyl-1,3-propanediamine and oleylamine.

7. A process according to claim 1, wherein the reagent is essentially oil-free and contains less than 1% of oil by volume.

8. A process according to claim 1, wherein the scale includes at least one species of scale-forming ion selected from the group consisting of $Na_2SiF_6$; $K_2SiF_6$; $CaSO_4$+2$H_2O$; $CaSO_4$+½ $H_2O$; $CaSO_4$; $MgSiF_6$+6$H_2O$; $Ca_3(PO_4)_2$; $CaHPO_4$; $Si_2F_6$; $CaSiF_6$+2 $H_2O$; $CaF_2$; $MgF_2$; $Mg_{0.8}Al_{1.5}F_6$+X $H_2O$, wherein X is an integer ranging from 2 to 10; $MgH_2P_6O_7$; $Al(PO_3)_3$; $NaK_2AlF_6$; $Ca_3(AlF_6)_2$+4 $H_2O$; $MgNaAlF_6$+2$H_2O$; and $Ca_4SO_4AlSiFi_3$+10$H_2O$.

9. A process according to claim 1, wherein said at least one stage of the phosphoric acid production process to which the reagent is added is selected from the group consisting of the milling stage; the digesting stage; the filtering stage; the evaporation stage; and the clarifying stage.

10. A process according to claim 9, wherein the stage to which the reagent is added is the filtering stage, evaporation stage, or both.

11. A process according to claim 1, wherein the reagent is added to any of the interstitial piping or process flow pipeline of the phosphoric acid production process.

12. A process according to claim 1, wherein the scale-inhibiting amount of reagent added to the wet process phosphoric acid production process is from 0.5 g per ton to 5000 g per ton of phosphoric acid.

13. A process according to claim 12, wherein the scale-inhibiting amount of reagent added to the wet process phosphoric acid production process is from 0.5 g per ton to 1000 g per ton of phosphoric acid.

14. A process according to claim 13, wherein the scale-inhibiting amount of reagent added to the wet process phosphoric acid production process is from 1.0 g per ton to 500 g per ton of phosphoric acid.

* * * * *